July 15, 1947.  R. F. VARNER  2,424,005
TRACTOR ACCESSORY
Filed June 25, 1945
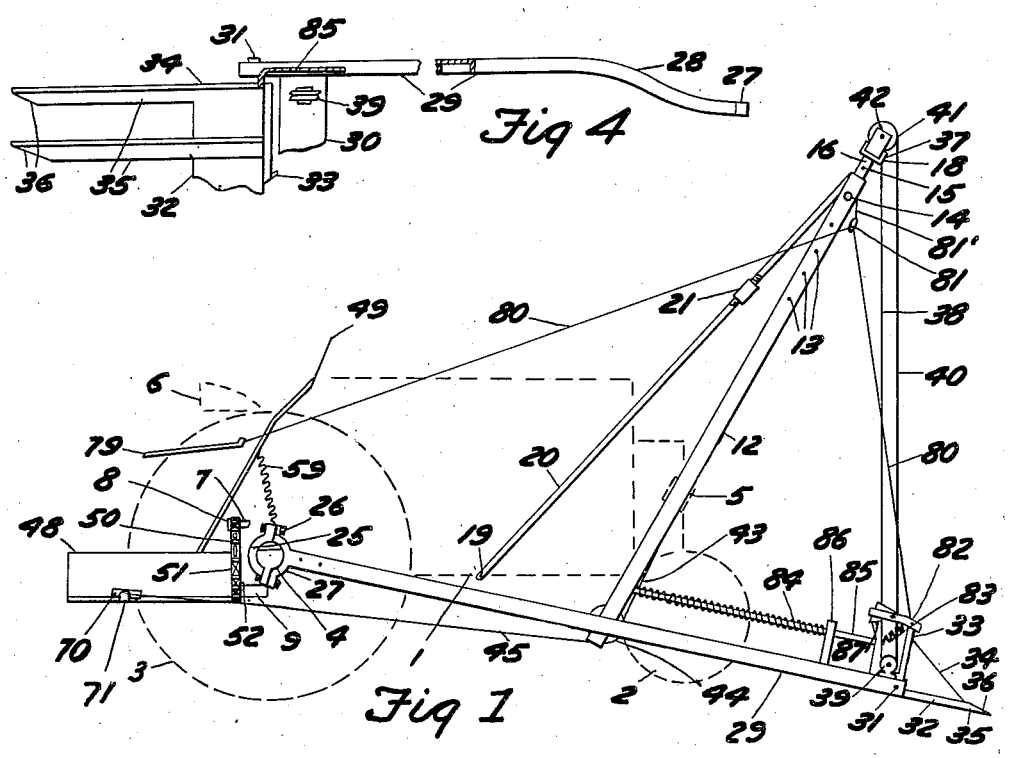
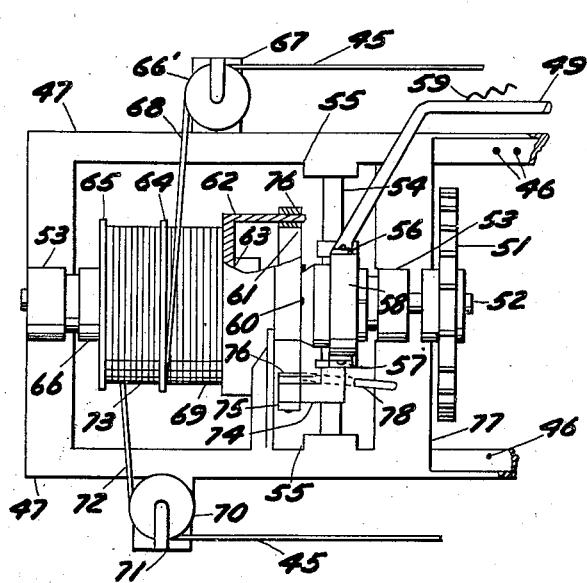
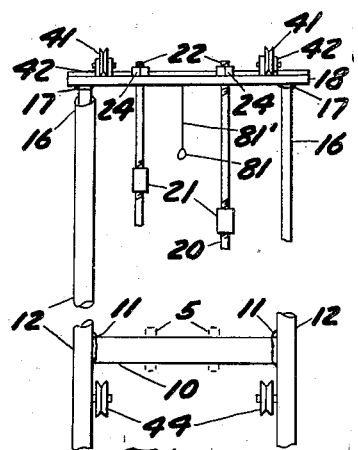
Inventor
Robert F. Varner
By
Attorney Patented July 15, 1947

2,424,005

UNITED STATES PATENT OFFICE 2,424,005

TRACTOR ACCESSORY

Robert F. Varner, Hicksville, Ohio

Application June 25, 1945, Serial No. 601,446

3 Claims. (Cl. 214—140)

This invention relates to the efficient directing and control of power, as from a portable prime mover, in clearing, digging and hoisting operations.

This invention has utility as an accessory or attachment for tractors, wherein the tractor chassis gives rigidity in the mounting of the boom or A-frame, as well as thrust connection for the working tool or shovel, and the tractor power take-off is connected for positioning and hoisting the tool or shovel.

Referring to the drawings:

Fig. 1 is a side elevation, with parts broken away, of an embodiment of the invention adapted to be assembled on a tractor, the general relation of the tractor thereto being shown in dotted lines;

Fig. 2 is a plan view, with the cover removed, of the tool positioning or hoist control unit connected to the tractor power take-off and adapted to be mounted on the draw bar connection from the tractor;

Fig. 3 is a front detail view of the boom portions for adjustable height with rigid assembly to overhang from the tractor forward end; and Fig. 4 is a fragmentary plan view of the tool or shovel and a thrust arm therefor.

A tractor chassis 1 is provided with a front pair of steering wheels 2 and a rear pair of larger propulsion wheels 3, having an axle housing 4. In the vicinity of the forward ground wheels 2 there is cultivator attachment clamp 5. At the after portion is located the driver's seat 6 and therebelow is a power take-off 7 provided with a horizontal axis sprocket pinion 8. From below the axle housing 4, centrally between the rear ground wheels 3, there is a draw bar connection 9.

The clamps 5 mount a horizontally extending iron cross bar 10 terminally having weld connections 11 with parallel upwardly extending tubes or pipes 12. Openings 13 in the tubes 12 allow for telescopic adjustment thru bolts or pins 14 thru openings 15 in inner pipes or rods 16. The upward outer ends of these rods or tubes 16 have weld connection 17 with a cross channel 18.

Pivotal connections 19 with the chassis 1, rearward from the clamps 5, mount forward and upwardly extending pipes 20, with couplings 21, to have terminally threaded portions 22 protrude thru the channel 18 and there be locked by nut means 24, to respond to the adjustment of the telescopic sections 12, 16, and the desired forward pitch to be given to the boom or A-frame 12, 16, 18.

A rocking bearing section 25 is connected by bolts 26 with a complementary rocking bearing section 27 of a thrust arm or channel adjacent a spread region 28, to forwardly extending parallel major portion 29. With this rocking bearing 25, 27, on the axle housing 4, there is in the forward spread, ample clearance as to the chassis 1, with transverse stability in cross plate member 30.

Slightly forwardly from the member 30 pivotal conection 31 swingably mounts a clearing or digging tool 32. In the instance shown, this is a shovel with a back 33, tapered sides 34, angle iron tines 35, with end points 36.

From connections 37 with the channel 18 cable reaches 38 extend about pulleys 39 on the plate member 30 adjacent the respective thrust arms 29. From thence there is upward cable reach 40 to pass about pulley 41 carried by bracket 42 upward from the channel 18. Downward and rearward from the pulley 41, cable reach 43 is about pulley 44 fixed to the inner lower portions of the tubes 12. Aft from the pulleys 44, cable reaches 45 extend below the axle housing 4.

Bolts 46 from the draw bar connection means 9 mount a power transmission frame 47 to project rearwardly from the housing 4. A gear housing 48 provides a cover to the mechanism on the frame 47, with a control handle 49 extending outwardly, forwardly and upwardly to a convenient control position for the tractor operator as at the seat 6.

About the sprocket pinion 8 is a sprocket chain 50 extending downwardly about a sprocket wheel 51 as a speed reduction drive for a shaft 52 mounted in bearings 53 on the frame 47. The control handle 49 is fixed with a rock shaft 54 extending transversely of the frame 47 and mounted in bearings 55. An operating arm or crank portion 56 of the handle 49 is in parallel with a crank arm 57 to engage a slide or clutch operating ring or sleeve 58 on the shaft 52. At full lift or rearwardly thrown position for the lever 49, against the tension holding of a spring 59 to a rocking bearing bolt 26, clutch expanding means 60 throw internal band clutch 61 against the inside of a drum 62 having a bearing 63 on the shaft 52. Fixed with the drum 62 are winding drum sections 64, 65, having a bearing 66 in alignment with the bearing 63. Accordingly, the drum section 62, 64, 65, as normally loose on the shaft 52, is connected thru the internal expansion clutch 61 to rotate with the splined sleeve 58 with the shaft 52 as driven by the sprocket wheel 51. From the rear, the shaft 52 as rotating clockwise, has from the left hand cable reach 45, about a pulley 66' on a bracket 67 from the frame 47, a cable pass section 68 to wind wraps 69 about the drum 64. Simultaneously, the right hand side rearwardly extending cable reach 45 passes about a pulley 70 on a bracket 71 fixed with the frame 47 oppositely and further rearwardly than the bracket 67. From the pulley 70, a cable portion 72 from the reach 45, extends to wraps 73 about the drum 65. Thus as clutched to the rear take-off, the cable portions 45, 43, 40, 38, hoist the bucket or shovel 32 at half the speed of the cable wrappings in the housing 48.

Should the operator desire to have the elevation of the shovel 32 stopped and so locked, the handle 49 is released to swing to its full forward or down position. This operation withdraws the splined sleeve 58 to release the clutch 61. Simultaneously, a crank 74 from the rock shaft 54, acts thru a link 75 to push upward on brake band 76 and thus grab the outside of the drum 62, as the inside has been cleared of the clutch 61. From a crosspiece 77 of the frame 47, which crosspiece 77 mounts one of the bearings 53, there is a hold-on or directing finger member 78 to preclude the band brake 76 as well as the clutch band 61 from shifting outward or clear of the drum 62.

The operator in the seat 6, may dump the bucket 32, say after causing the tractor 1 to travel to the desired location for discharge. Say to a fender or other convenient position as to the seat 6, a catch or tie 79 has a pull line 80 therefrom passing thru an eye or ring 81 having a suspension connection 81' from the channel 18 central portion. The line 80 extends to pull a trigger 82 against the resistance of a spring 83. As so pulled, the trigger 82 releases the shovel back 33 for the forward tines 35 to swing downward about the pivot connection 31, and the accumulated material thus falls clear of the shovel. When so relieved of its load, compression helical springs 84 on rods 85 passing thru guides 86 on the arms 29, to the shovel back 33, reset the shovel to be engaged by the trigger 82 in its limited swing mounting on a bracket 87 rising from the central portion of the cross member 30.

From such elevated locked position for the shovel 32, lowering may be had. In practice, the tractor is moved back to the place where the operations of gathering, digging, or the like, is to have the cycle renewed. With the tool directed from forwardly of the chassis 1, the handle 49 at its mid position, or lifted somewhat from fully forward, releases the brake 76, without connecting the clutch 61, and the scraper 32 settles by gravity.

Primarily, it is to be seen, that the disclosure herein has to do with broadening the range of power use from a tractor or the like. By providing the rockable bearings 25, 27, for the arms 29 in maximum spread or spanning width, there is positive transverse rigidity in the directing and holding for the tool 32, even were such contoured and located to form a furrow or dig a trench or ditch. The thrust is taken directly on the tractor rear axle housing 4. For surface work, there may be throwing of root crops out of the ground, as the tractor moves ahead with the tool 32 locked against fall or rise by the holding action of the brake friction band 76 on the drum 62. Inasmuch as the thrust direction line is below that of the axle housing 4, the holding precludes increase in depth course for the tool 32. Weeds, other growth, or smoothing of the top soil region may be given attention.

These various functions are available in the holding of the tool into the particular work as thrust by the tractor travel. Material pick-up, as in filling the shovel 32, may be followed by a shifting of the tractor to the place for deposit of the material so gathered. The deposit or dumping may be on the ground, into a bin, or a vehicle. The height to which the tool is to be brought prior to dumping may be reset by adjusting the extent of telescoping between the frame or boom side members 12, 16, with compensation for such resetting thru the rigid guys or struts 20, 21, 22, and the adjustments 24.

The crosswise width of swath for the tool 32 is stable against twist or skew. It will hold to its course as positively as the tractor itself. This is not only as to tractor travel, due to the wide spread of the arms 29 and their direct positive anchoring, but as to hoisting, for at the ends or maximum width regions of the tool 32, the down reaches 38 to the up reaches 40, inclined reaches 43 and rearward under reaches 45, all away from hazard to the driver of the tractor, have these cables in parallel as a dual transmission.

The friction clutch 61 and friction brake 76 provide for definite grab at any required condition for pickup or locking.

What is claimed and is desired to secure by Letters Patent is:

1. A power tool adapted to be mounted on a prime mover provided with a rear axle, said tool comprising an adjustable length frame rigidly connectable to and inclined upwardly and forwardly from the prime mover, tool handle directing and thrusting arms extending rearwardly outside the frame and embracing the rear axle in providing coaxially therewith pivotal mounting at the prime mover opposite sides, said prime mover having a rear power take-off, and controllable hoist connections adapted to be connected to the take-off and extend under the prime mover to the upper forward frame portion and from thence to the forward portions of the thrusting arms directly down therefrom.

2. A tractor accessory comprising an upwardly inclined boom providing frame, strut cooperative mounting means for directing the frame into a forward overhang position from a tractor in positively anchored fixed assembly, adjustable means for varying the length of the boom frame, a tool, arms rearwardly from the tool, spanning the frame and rockably mounted on the tractor rear axle housing, controllable transmission means adapted to be rigidly connected to a draw bar fitting of a tractor, a speed reduction drive adapted to be connected to a rear power take-off of a tractor for actuating the transmission means, and cable connections in parallel from opposite sides of the tool thru the frame and beneath the tractor to the transmission means.

3. A drive for operating a tool in two directions comprising two cables having downwardly extending bights to opposite spaced-apart portions of the tool, carrying connections in parallel inclined upwardly to overhang the tool and provided with cable end anchoring means for one end of the bights of said two cables and guide pulleys for the cables from the other ends of the bights to extend in parallel reaches, drum means having an axis in parallel with and between the parallel reaches for simultaneous opposite side cable wrapping on said drum means, friction face-providing clutch and brake means for the drum means, a drive, and a single control member for the clutch and brake means at one limit to drive the tool, at the other to lock, and intermediate for release.

ROBERT F. VARNER.

REFERENCES CITED

The following references are of record in the file of this patent:

UNITED STATES PATENTS

| Number | Name | Date |
|---|---|---|
| 1,733,969 | Knapp | Oct. 29, 1929 |
| 1,784,558 | Underland | Dec. 9, 1930 |
| 1,871,599 | Fredrick | Aug. 16, 1932 |
| 2,246,083 | Weber | June 17, 1941 |
| 2,322,472 | Sandvig | June 22, 1943 |
| 2,357,954 | Johnson | Sept. 12, 1944 |
| 2,361,341 | Weikert | Sept. 12, 1944 |
| 2,402,071 | Nehring | June 11, 1946 |